Figure 1:
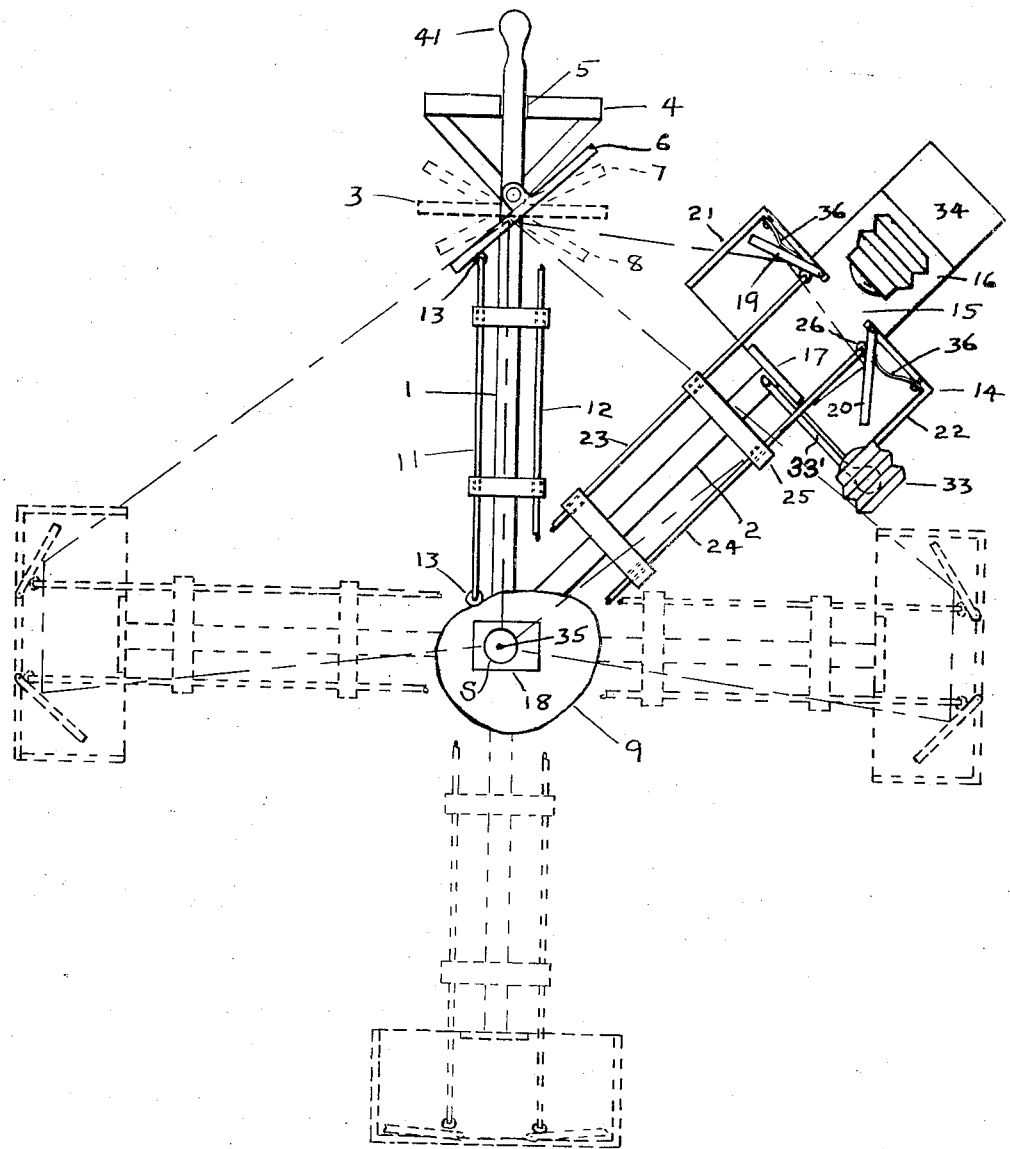

July 25, 1933.                L. G. SIMJIAN                 1,919,642
                        POSE REFLECTING APPARATUS
                         Filed Nov. 23, 1931           8 Sheets-Sheet 1

INVENTOR
LUTHER G. SIMJIAN
by George H. Elwell
                ATTY

July 25, 1933.  L. G. SIMJIAN  1,919,642
POSE REFLECTING APPARATUS
Filed Nov. 23, 1931    8 Sheets-Sheet 2

INVENTOR
LUTHER G. SIMJIAN
by George H. Elwell
ATTY

July 25, 1933.  L. G. SIMJIAN  1,919,642

POSE REFLECTING APPARATUS

Filed Nov. 23, 1931  8 Sheets-Sheet 5

INVENTOR
LUTHER G. SIMJIAN
by George A. Elwell
ATTY

July 25, 1933.  L. G. SIMJIAN  1,919,642
POSE REFLECTING APPARATUS
Filed Nov. 23, 1931   8 Sheets-Sheet 7

INVENTOR
LUTHER G. SIMJIAN
by George H. Elwell
ATTY

July 25, 1933.　　　　L. G. SIMJIAN　　　　1,919,642
POSE REFLECTING APPARATUS
Filed Nov. 23, 1931　　　　8 Sheets-Sheet 8

INVENTOR
LUTHER G. SIMJIAN
by George H. Elwell
ATTY

Patented July 25, 1933

1,919,642

UNITED STATES PATENT OFFICE

LUTHER G. SIMJIAN, OF NEW HAVEN, CONNECTICUT

POSE REFLECTING APPARATUS

Application filed November 23, 1931. Serial No. 576,801.

This invention relates to improvements in pose reflecting apparatus and especially to such class of pose-reflecting apparatus adapted to collect pose-reflections from pose-reflecting mirrors bodily carried by a sweeping supporting arm.

The objects of the invention are to provide a movable collecting mirror so associated with pose-reflecting mirrors bodily movable around a circular area, and adjustable as to such relative facing angles, that a posing subject within said area may see in the collecting mirror his image at an angle according to the particular bodily and adjusted positions of said mirrors; to provide, in connection with a pose-reflecting apparatus, pose-reflecting mirrors bodily movable around a central posing area, together with a camera focused upon a posing subject; to provide, in connection with a pose-reflecting apparatus, pose-reflecting mirrors bodily movable around a central posing area, together with a pivotally mounted camera to be focused upon the collecting mirror; to provide, in connection with the aforesaid type of pose-reflecting apparatus, such geared connection between a sweeping arm, bodily carrying pose-reflecting mirrors, and an arm carrying a collecting mirror, that will adapt the sweeping arm for a full sweeping movement upon the slight movement of the other arm; to provide, in connection with the aforesaid type of pose-reflecting apparatus, an operating means so geared to a sweeping arm, bodily carrying pose-reflecting mirrors, that said arm may be thereby moved around a central posing area; to provide, in connection with the aforesaid type of pose-reflecting apparatus, cam means adapted to operate rods with which each of the pose-reflecting mirrors is connected to move such mirror to a predetermined facing angle according to its bodily position around a central posing area; to provide, in connection with the aforesaid type of pose-reflecting apparatus, a fixed groove structure substantially surrounding a central posing area and having such an irregular course in which travels a finger eccentrically provided by a swinging mirror bodily carried by a sweeping arm that determines the facing angle of the mirror according to the bodily movement; to provide, in connection with the aforesaid type of pose-reflecting apparatus, a movable groove structure carried by a sweeping arm and substantially surrounding a central posing area and having such an irregular course in which a finger travels, the finger being eccentrically mounted upon pivotally movable collecting mirror, that the facing angle of the collecting mirror is varied according to the relative position of said finger within said groove; to provide, in connection with the aforesaid type of pose-reflecting apparatus, lighting units focused upon the posing subject to provide a light-path along the line of reflection; and to provide, in connection with the aforesaid type of pose-reflecting apparatus, floor or overhead supporting means for the installation and operation thereof, and draperies therearound. With these and other objects in view, as may become apparent from the within disclosures, the invention consists not only of the structures herein pointed out and illustrated by the drawings, but to further structures limited only by the scope of what hereinafter may be claimed.

Figure 2:
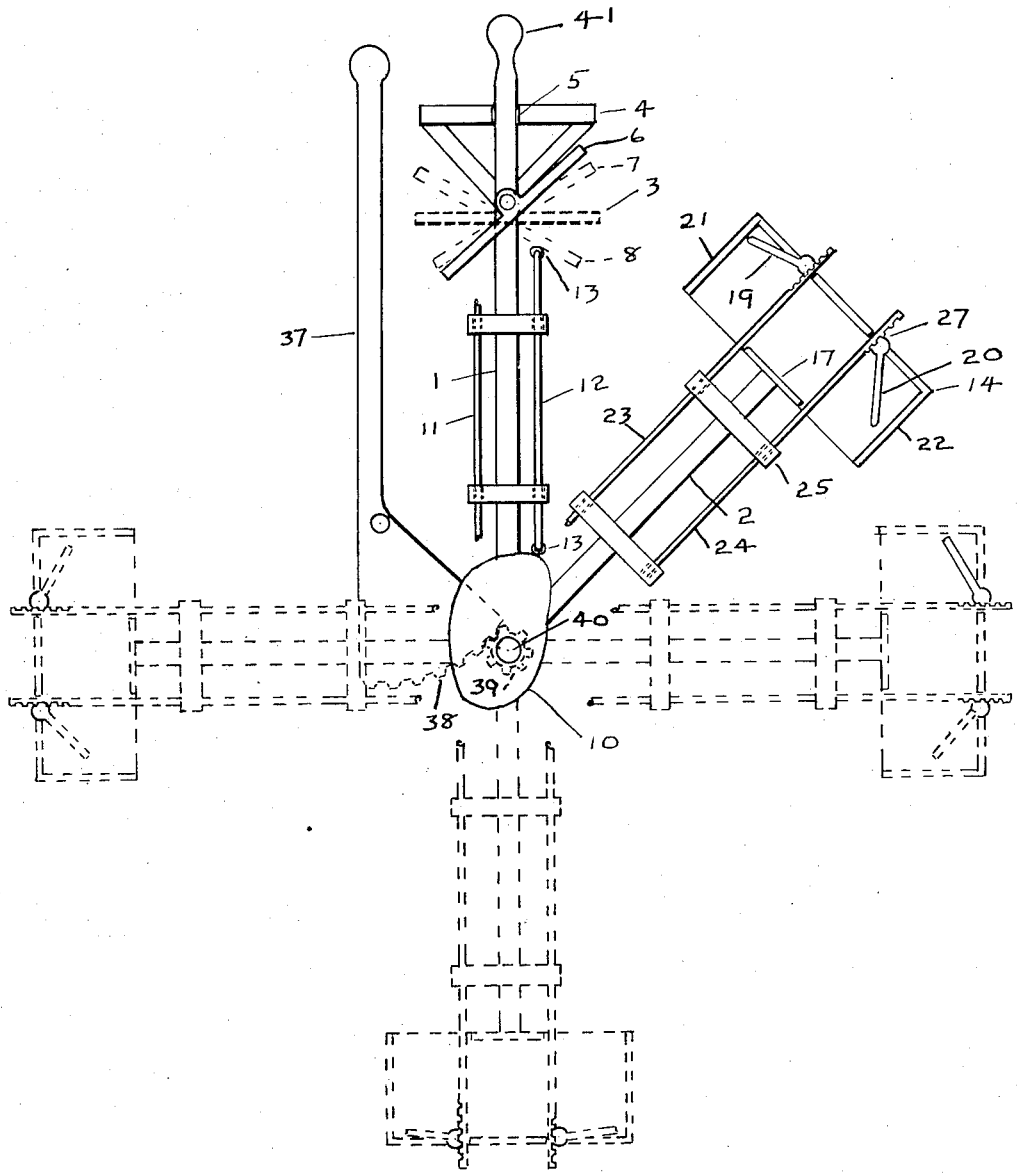
Figure 3:
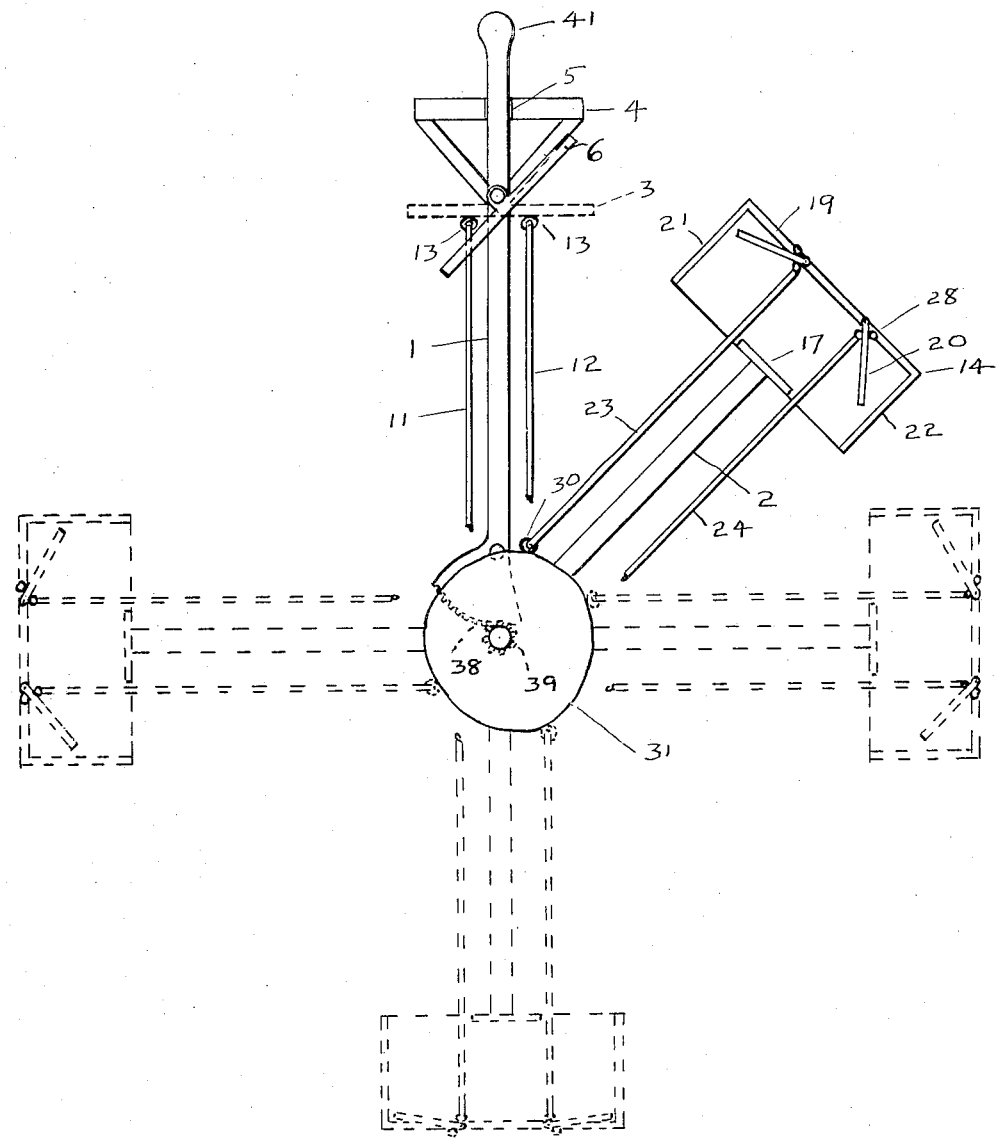
Figure 4:
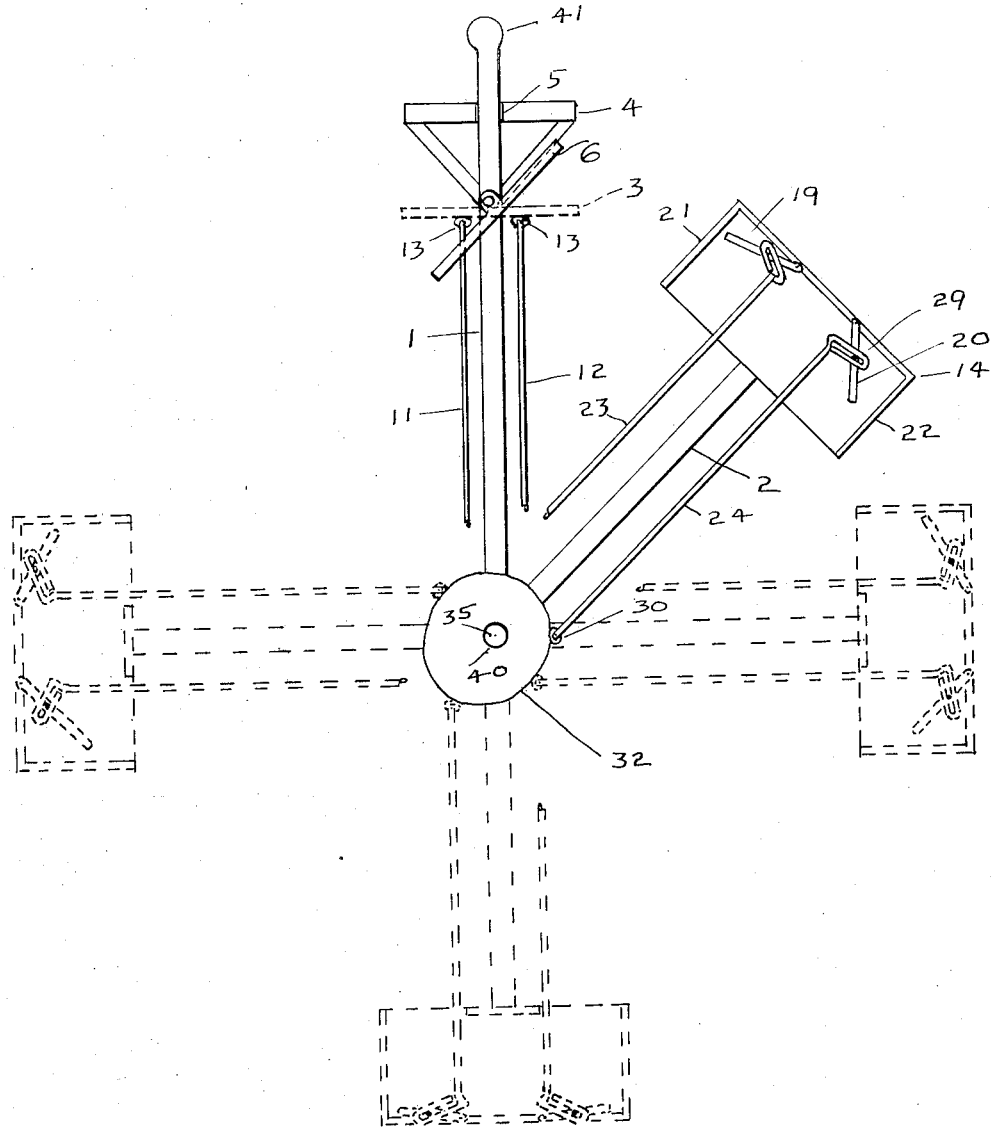
Figure 5:
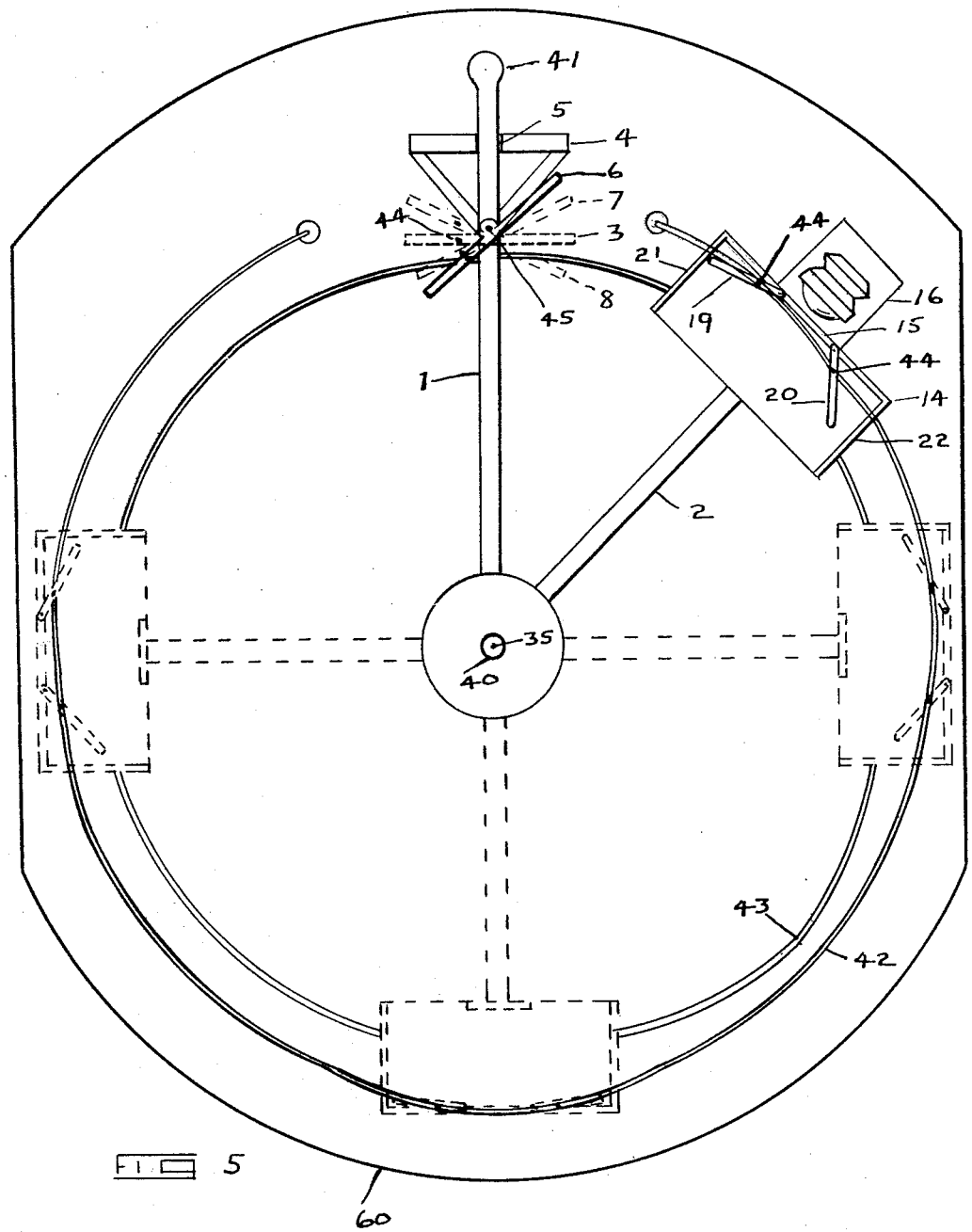
Figure 6:
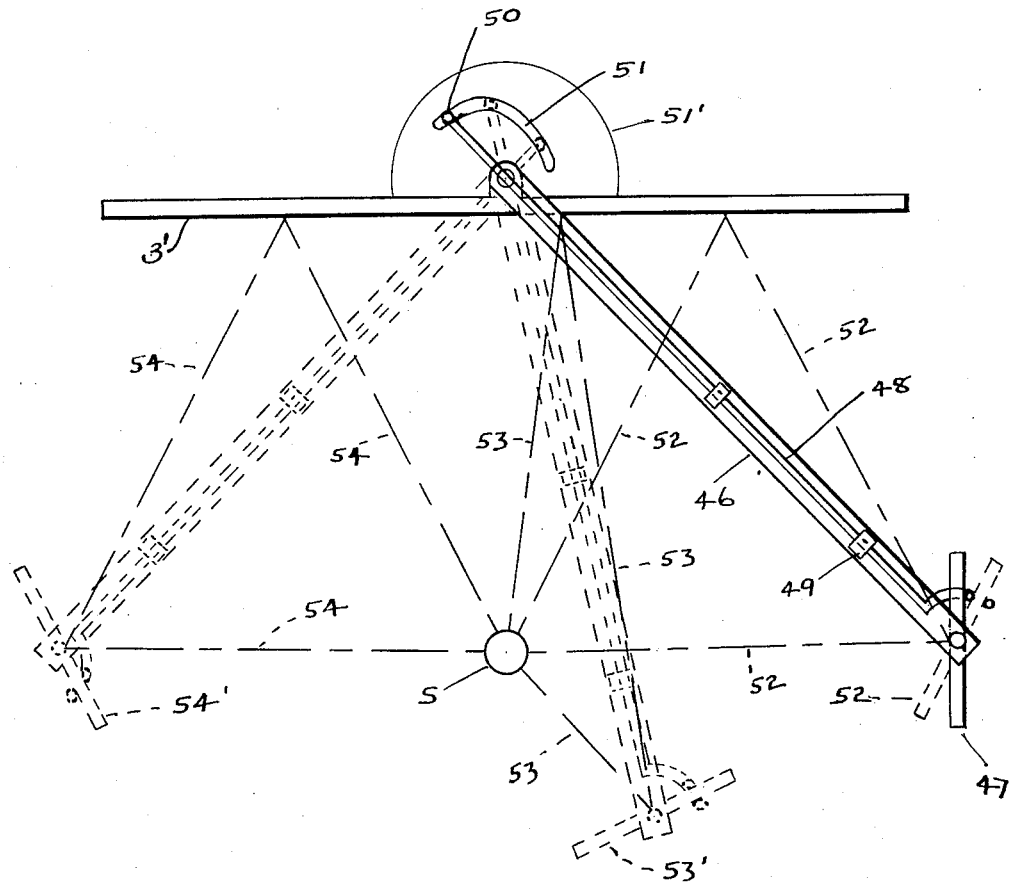
Figure 7:
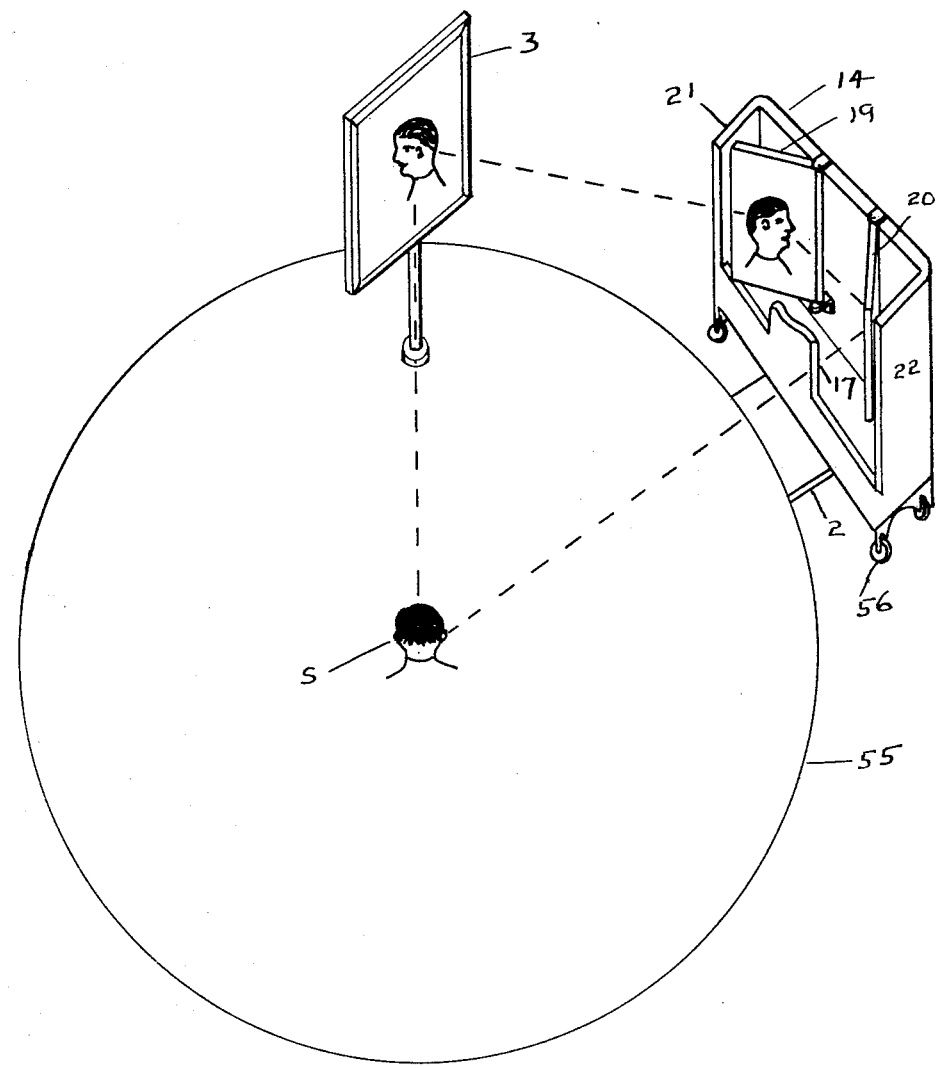
Figure 8:
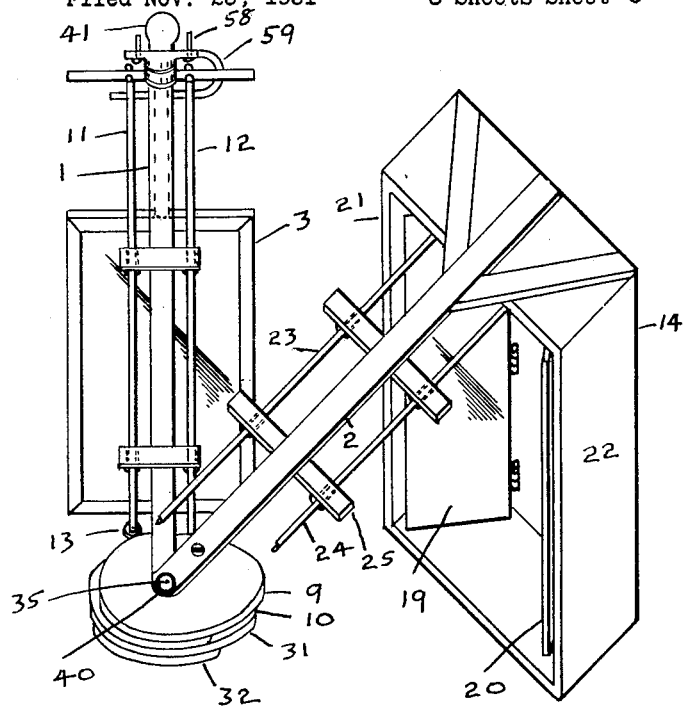
Figure 9:
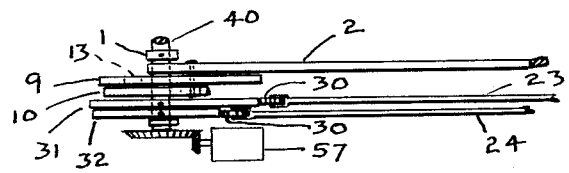

The character of the invention, however, may be best understood by reference to certain of its structural forms, as illustrated by the accompanying drawings in which the Figure 1 is a diagrammatic plan view of one form of apparatus, illustrating in full and dotted lines different bodily positions of the pose-reflecting mirrors, and cam means as effecting the movement of one of the rods having a thrust connection with the collecting mirror; the Figure 2 is a diagrammatic plan view similar to that of the previous figure excepting that it illustrates a cam means as effecting the other of the rods having a thrust connection with the collecting mirror, and other rods having a rack and pinion connection with pose-reflecting mirrors, the figure further illustrating gear means for operating a sweeping arm; the Figure 3 is a diagrammatic plan view similar to that of the previous figures excepting that a cam means is illustrated as having operative connection with one of the rods having a forked connection with the pose-reflecting mirrors; the Figure 4 is a diagrammatic plan view similar to the previous figures excepting that a cam means is illustrated as having operative connection with the other of the rods, but having a pin and slot connection with the pose-reflecting mirrors; the Figure 5 is a diagrammatic plan view of another form of apparatus by which the facing angles of the collecting mirror and the pose-reflecting mirrors are illustrated as being determined by an eccentric finger of each mirror extending within a groove of irregular course and relative movable as regards the fingers, the apparatus being illustrated as enclosed within draperies; the Figure 6 is a diagrammatic plan view of another form of apparatus illustrating associated collecting mirror having a broad scope of reflecting surface with pose-reflecting mirrors having a bodily movement by means of a sweeping arm pivotally swung from the center of the collecting mirror, the pose-reflecting mirrors being automatically adjusted with regard to facing angles during the bodily movement; the Figure 7 is a top perspective view of the apparatus illustrating the pose-reflection as reflected by the pose-reflecting mirrors and collected by the collecting mirror, all mechanism being omitted; the Figure 8 is a perspective view of the apparatus, illustrating an overhead supporting and operating means, including the cams for operating the mirror controlling rods; and the Figure 9 is an edge view of said cams in engagement with rods thereby operated and associated with a motor as a means, if desired, to operate the arms especially when having a gear connection.

Referring more particularly to the several drawings, the Figures 1, 2, 3, and 4 illustrate the apparatus in substantially the same form excepting for the particular manner in which the cam-operated rods are connected with the pose-reflecting mirrors; for the Figure 1 shows that connection by a thrust means, while the Figure 2 shows that connection as by rack and pinion means, the Figure 3 by forked means, and the Figure 4 by pin and slot means. With these exceptions, each of the figures is intended to disclose, in different degrees of completion, one form of apparatus having the pivotally mounted arm 1, the pivotally sweeping arm 2, the collecting mirror 3 movably supported by the arm 1, the free end of the arm 1 being supported by the support 4, having the depression 5 in which the arm 1 may rest. Besides the full line position of the collecting mirror 3, that mirror is adapted for any angle of facing, including the facing angles 6, 7 and 8 as illustrated in dotted lines by the Figure 1, these positions being automatically assumed according to the relative position of the cams 9 and 10, relatively fixed one to the other and to the arm 2, to the operating rods 11 and 12 having at either end the rollers 13 engageable at one end with the cams 9 and 10 and at the other end with the face of the mirror 3 upon either side of the pivotal mounting. The pivotally sweeping arm 2 supports at its free end a cabinet 14 having the rear opening 15, a camera platform 16, a forwardly positioned and removable or apertured obstruction 17, and an overhead lighting unit 18. The pose-reflecting mirrors 19 and 20 are movably mounted within the cabinet 14, the sides 21 and 22 of the cabinet 14 being low or provided each with an aperture (not illustrated). The facing angles of the pose-reflecting mirrors 19 and 20 are controlled by the rods 23 and 24 held by the brackets 25 for a longitudinal movement therein, as illustrated by the Figure 1, and having at one end either a thrust 26, rack and pinion 27, fork 28, pin and slot 29, or other connection with the pose-reflecting mirrors 19 and 20, while at the opposite end, as illustrated by the Figures 3 and 4, the rods 23 and 24 are provided with the rollers 30 adapted for travel upon the cams 31 and 32 relatively fixed as regards one another and the arm 1, as illustrated by the Figure 9. When the connection of the rods 23 and 24 with the pose-reflecting mirrors 19 and 20, respectively, is by thrust means, the mirrors 19 and 20 are provided with spring means 36 against the tension of which the thrust is operated. The cams 9 and 10 may be made in one piece as may also the cams 31 and 32. Pivotally carried by the bracket 33' mounted upon the cabinet 14 is the side camera 33 adapted to be shifted from a position at the side 22, as illustrated by the Figure 1, to a similar position at the opposite side 21 of the cabinet 14 to adapt the camera to be focused upon the collecting mirror 3 regardless of the bodily position of the cabinet 14. A lighting unit 18 is located overhead at the pivotal point 35 of the arm 2 and a similar lighting unit 34 is also located at the free end of arm 2, both lighting units providing light-paths along the lines of reflection. The Figure 2 illustrates a lever 37 having a geared connection with a small gear 39 mounted upon the cam 9 to which the sweeping arm 2 is fixed, so that, upon the slight movement of the lever 37, the arm 2 may be sweepingly moved by the geared connection 38 to its various positions around a central posing area, but the Figure 3 illustrates how the sweeping movement of the arm 2 may be accomplished by a similar geared connection 38 between the arms 1 and 2 through the medium of the small gear 39 fixed to the cam 9. The movement of the sweeping arm 2, of course, is not confined to such manual means as a hand lever, but may include a motor driven movement by means of the motor 57, as illustrated by the Figure 9. When however the movement of the arm 2 is accomplished by the manual movement of the arm 1, the handle 41 is provided as a convenient means by which the arm 1 may be manually moved out of the holding depression 5 and operated as a lever the necessary distance to obtain the desired relative bodily positions of collecting and pose-reflecting mirrors.

The Figure 5 illustrates another way by which the collecting mirror 3, and the pose-reflecting mirrors 19 and 20, may be automatically adjusted as regards their facing angles. The apparatus therefor is provided with a fixed groove structure 42 and a movable groove structure 43, the latter being carried by the cabinet 14, each groove structure having a substantially circular but irregular course. Each of the mirrors 3, 19 and 20 is provided with a finger 44 eccentrically mounted thereon parallel to the pivotal axis of each mirror, the finger 44 of the mirror 3 extending into the movable groove structure 43, and the fingers 44 of the mirrors 19 and 20 extending into the groove of the fixed structure 42, so that, as the arm 2 is made to move, the fingers 44 become relative movable with regard to the respective irregular courses of the groove structures 41 and 42 to thereby determine the facing angle of each mirror in its relative importance, one to the others, to establish, at various bodily positions around a central posing area, such pose-reflections as will reflect the image of a posing subject S by the pose-reflecting mirror 20 into the mirror 19 and reflected by the mirror 19 into the collecting mirror 3, as illustrated by the Figures 1 and 7, thus enabling the posing subject S to see in the collecting mirror 6 the particular angle of his pose as reflected by the mirror 20.

The Figure 6 illustrates a collecting mirror 3' having a broad scope of reflecting surface. This mirror 3' may be in a fixed position or pivotally mounted, as at 45, to provide the mirror 3' with adjusting means as regards its facing angle. The arm 46 is also pivotally mounted at 45, the center of the collecting mirror 3'. At the free end of the arm 46 is provided the pose-reflecting mirror 47 movably mounted thereon, the mirror 47 being automatically adjusted, with regard to its facing angle, by means of the rod 48 movably carried within the brackets 49 mounted upon the arm 46, one end of the rod 48 having a connection with the pose-reflecting mirror 47, such as the forked connection 28 already described, and the other end having the bent portion 50 adapted to travel within the cam slot 51 of the block 51' mounted upon the back of the mirror 3' at its top or bottom from which the arm 46 is swung, so that as the arm 46 is swung to any position, such as illustrated in full or dotted lines, the rod 48 will be forced to move longitudinally and thereby adjust the mirror 47 to obtain the desired pose-reflections of a posing subject S, as for instance along the dotted lines 52, 53 or 54. The pose-reflecting apparatus above described in the different forms is adapted to be supported by arms 1 and 2 or arm 46, with geared or other moving means, installed adjacent the floor of an enclosure, having a platform 55 thereover as illustrated by the Figure 7, or such arms 1 and 2 or 46, with geared or other moving means, suspendedly installed from the ceiling by means of the bolts 58 and a suitable bearing for the post 40, said bearing not being illustrated, the ceiling installation being illustrated by the Figure 8, the free end of the arm 1 resting in the supporting slot 59, and in either instance the movable cabinet 14 may be provided with the wheels 56, as illustrated by the Figure 7.

The culminating purpose of this pose-reflecting apparatus, in whatever form it may be presented, is to so associate collecting and pose-reflecting mirrors as to permit a posing subject to stand or sit within a central posing area partially defined by a movable collecting mirror and around which area a sweeping arm may bodily move pose-reflecting mirrors, the facing angles of which are automatically adjusted as bodily moved to establish such a pose-reflection as will enable the posing subject to see in the collecting mirror such an angle of his pose as reflected by the pose-reflecting mirror in the particular bodily and adjusted position to which the pose-reflecting mirror may have been moved around the central posing area.

The pose-reflecting apparatus, above described, is designed to be used not only in connection with a camera, but also in connection with such reflecting systems whereby it is advantageous for one to see his reflected image at varied angles in either bust or full length form to display, for instance, coiffure or facial or body angles, the apparatus, if desired, being surrounded by the draperies 60.

I claim:—

1. In a pose-reflecting apparatus, the combination of two mirrors so separately and movably mounted as to be adapted for bodily movements around a common central posing area, and automatic means adapted to adjust, during the bodily movements, each mirror as regards relative facing angles thereof to enable a posing subject, regardless of the bodily positions of said mirrors, to see in one mirror his image at such angle as reflected therein by the other mirror.

2. In a pose-reflecting apparatus, the combination of two mirrors so separately and movably mounted as to be adapted for bodily movements in opposite directions around a common central posing area, and automatic means adapted to adjust, during the bodily movements, each mirror as regards relative facing angles thereof to enable a posing subject, regardless of the bodily positions of said mirrors, to see in one mirror his image at such angle as reflected therein by the other mirror.

3. In a pose-reflecting apparatus, the combination of two mirrors so movably mounted upon supports as to adapt one mirror for bodily movement around a central posing area, said movement radiating from the approximate center of the other mirror having a broad scope of reflecting surface, and automatic means provided by said supports and adapted to adjust substantially throughout a complete turn of said mirror movable around the central posing area the bodily movable mirror with regard to its facing angle, to enable a subject posing in one position only, to see in some portion of the broad reflecting surface of one mirror his image at such angle as reflected therein by the bodily positioned mirror.

4. In a pose-reflecting apparatus, the combination of a movable collecting mirror and a pivotally movable arm supporting a movable mirror for bodily movement around a central posing area partially defined by the collecting mirror, both mirrors during the bodily movements being automatically adjusted as regards relative facing angles thereof to enable a subject posing in one position only to see in the collecting mirror his image at such angle as reflected therein by the other mirror, such angle varying according to the relative positions of said mirrors.

5. In a pose-reflecting apparatus, the combination of two pivotally movable arms supporting movable mirrors for bodily movements around a common central posing area and for such relative adjustment as regards facing angles of said mirrors as will enable a posing subject to see in the mirror supported by one arm his image at such angle as reflected therein by a mirror supported by the other arm.

6. In a pose-reflecting apparatus, the combination of two pivotally movable arms having a geared connection and supporting movable mirrors for bodily movements in opposite directions around a common central posing area and for such relative adjustment as regards facing angles thereof as will enable a posing subject to see in the mirror supported by one arm his image at such angle as reflected therein by a mirror supported by the other arm.

7. In a pose-reflecting apparatus, the combination of two pivotally movable arms having a geared connection and supporting at their free ends movable mirrors for bodily movements in opposite directions around a common central posing area, and means for automatically adjusting, during the bodily movement, each mirror as regards relative facing angles thereof as will enable a posing subject to see in the mirror supported by one arm his image at such angle as reflected therein by a mirror supported by the other arm, such angles varying according to the relative positions of said mirrors.

8. In a pose-reflecting apparatus, the combination of two pivotally movable arms supporting at their free ends movable mirrors, the arms having such geared connection as will, by the slight movement of one arm, sweepingly move the other arm thus bodily moving the mirror carried thereby around a central posing area, and means for automatically adjusting, during the bodily movement, each mirror as regards their relative facing angles as will enable a subject posing in one position only, regardless of the relative positions of said arms, to see, in the mirror supported by one arm, his image at such angle as reflected therein by a mirror supported by the other arm.

9. In a pose-reflecting apparatus, the combination of two pivotally movable arms supporting at their free ends movable mirrors for bodily movement around a common central posing area, and cam operated means adapted to automatically adjust during the bodily movements each mirror as regards relative facing angles thereof to enable a posing subject, regardless of the relative positions of said arms, to see in the mirror supported by one arm his image at such angle as reflected therein by a mirror supported by the other arm.

10. In a pose-reflecting apparatus, the combination of two pivotally movable arms supporting at their free ends movable mirrors for bodily movement around a common central posing area, automatic means for adjusting, during the bodily movements, each mirror as regards relative facing angles thereof, and lighting units carried by the arms to provide a light-path along lines of reflection, a posing subject thereby being enabled, regardless of the relative positions of said arms, to see in the mirror supported by one arm his image at such angle as reflected therein by a mirror supported by the other arm.

11. In a pose-reflecting apparatus, a combination of multiple mirrors consisting of a collecting mirror and a second mirror on the side thereof and a third mirror in between said mirrors adapted to take the reflection from one of said mirrors and reflect the same into the other mirror, and means adapted to move the outer and intermediate mirrors around the subject, whereby the subject may see his reflection in different angles in one of said outer mirrors.

12. In a pose-reflecting apparatus, the combination of two mirrors spaced apart, one of which is a collecting mirror having a broad scope of reflecting surface, a pivotally mounted arm radiating from a line intersecting the approximate center of said collecting mirror, said arm being connected to the second mirror and carrying means adapted to angularly adjust the second mirror as the said arm moves around the posing subject, to constantly reveal to the subject while posing in one position only his reflection in the said collecting mirror while the second mirror is moving and changing its angle.

13. In a pose-reflecting apparatus, the combination of three pivotally mounted mirrors so relatively arranged that one of said mirrors will be adapted to collect the reflection of a posing subject to pose-reflect the same into an outer mirror through the medium of an intermediate mirror, said last mentioned mirrors being adapted for bodily movement around the posing subject and for varying changes of facing angles during the bodily movement, whereby the subject may see different angles of his image in one of the mirrors.

LUTHER G. SIMJIAN.